March 19, 1946.  R. L. LINCOLN  2,397,022
DUST COLLECTOR
Filed Sept. 21, 1943  2 Sheets-Sheet 1

Inventor:
Roland L. Lincoln.
by Robert J. Palmer
Attorney.

Inventor.
Roland L Lincoln.
by Robert J. Palmer
Attorney.

Patented Mar. 19, 1946

2,397,022

UNITED STATES PATENT OFFICE 2,397,022

DUST COLLECTOR

Roland L. Lincoln, Dover, Mass., assignor to B. F. Sturtevant Company, Boston, Mass.

Application September 21, 1943, Serial No. 503,217

1 Claim. (Cl. 183—81)

This invention relates to dust collectors and has as objects the reduction in size of, and the improvement in efficiency of, dust collectors.

Dust collectors having a plurality of small cyclines in a single casing are in general use and are preferred in many cases because of the relatively high collection efficiency. Such prior collectors have used vertical dust free, gas outlet tubes with spinning vanes around the outlet tubes which spin the dust laden gas entering the cyclones.

For isolating the dust laden and the dust free gas streams in such a collector, it has been the practice to increase the heights of the upstream rows of gas outlet tubes substantially above those of the down stream rows and to provide a plate inclined at an angle of about 45° around the upper ends of the gas outlet tubes, the dust laden gas passing under this plate and the dust free gas passing above this plate. This not only has resulted in increased collector size and height requiring more space and material but the upstream gas outlet tubes block the gas inlet passages resulting in different gas velocities in the different cyclones and in substantial turbulence.

This invention provides a collector of this general type in which the gas outlet tubes all have the same height resulting in savings in space and material and in increased efficiency through the attainment of uniform velocities and the elimination of turbulence.

The invention will now be described with reference to the drawings, of which:

Figures 1, 2:
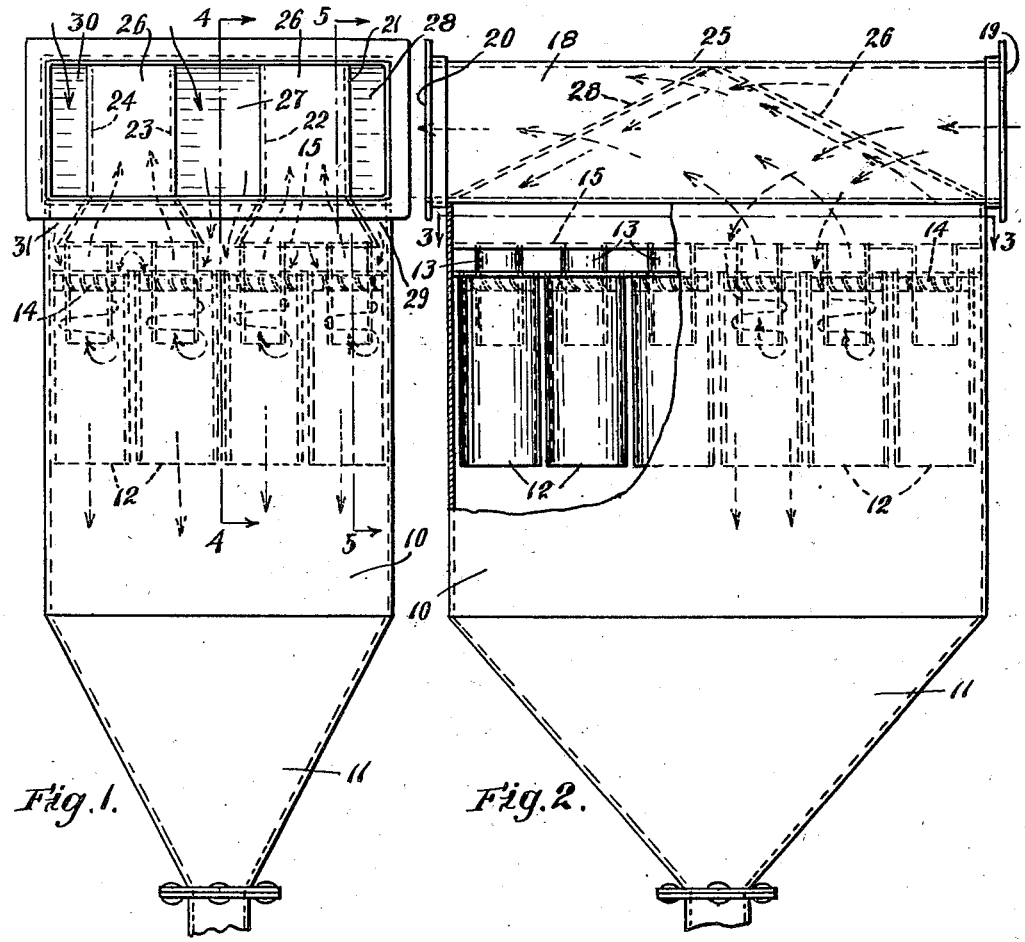
Fig. 1 is an end elevation of a dust collector embodying this invention.
Fig. 2 is a side elevation of the dust collector of Fig. 1.
Figure 3:
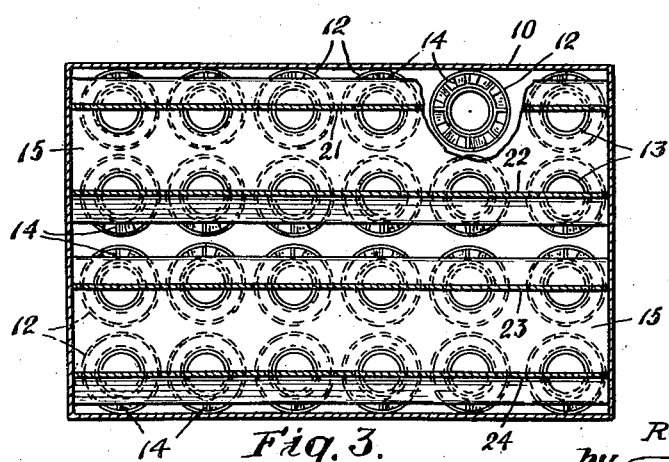
Fig. 3 is a sectional view along the lines 3—3 of Fig. 2.
Figure 4:
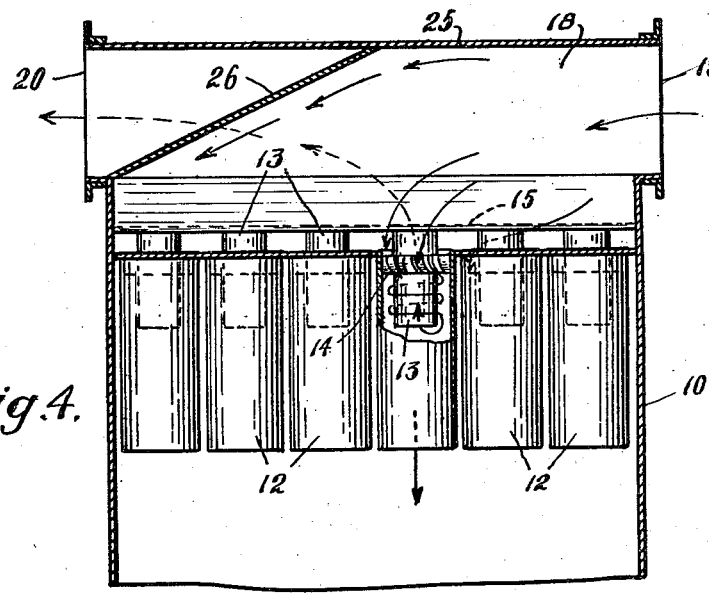
Fig. 4 is a sectional view along the lines 4—4 of Fig. 1.
Figure 5:
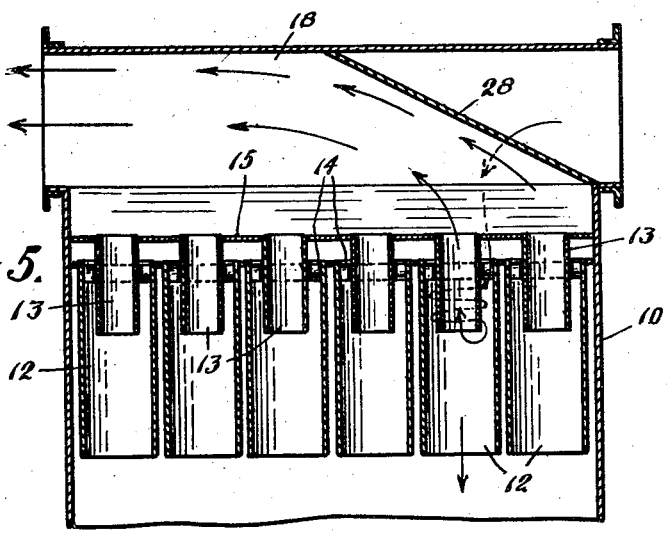
Fig. 5 is a sectional view along the lines 5—5 of Fig. 1.
Figure 6:
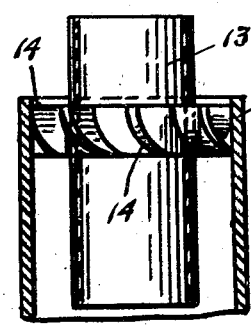
Fig. 6 is an enlarged view of the upper portion of one of the cyclone assemblies of the dust collector of Figs. 1-5 and illustrates the vanes for spinning the dust laden air.

The collector illustrated includes the casing 10 which has the lower dust receiving hopper 11 and which above the hopper contains the plurality of similar outer, vertically extending cylindrical tubes 12 which act as cyclone collectors and the plurality of similar inner tubes 13 which extend from the upper ends of the tubes 12 in axial alignment therewith and which serve as dust free outlet tubes.

At the upper ends of the tubes 12 and between same and the tubes 13 are the spin vanes 14 which serve to spin the dust laden gas entering the tubes 12 for causing the dust to be thrown out against the inner surfaces of the tubes 12 for separation and collection.

The construction described in detail in the foregoing is old in the art. This invention consists in the prevision of the novel gas inlet and outlet passages row to be described for use with the old collection apparatus described in the foregoing.

The upper ends of the outlet tubes 13 terminate in circular apertures in the two similar upper partitions 15. The upper ends of the cyclone tubes 12 terminate in circular apertures in the lower partition 17.

The horizontal duct 18 extends above the tubes and partitions described in the foregoing and has a dust laden gas inlet 19 and a dust free gas outlet 20. Two spaced walls 21 and 22 extend upwardly from the upper partitions 15 to the upper center of the duct 18 and have their upper portions formed as isosceles triangles with apices contacting the lower surface of the upper horizontal wall 25 of the duct 18. Two walls 23 and 24 similar to the walls 21 and 22 extend upwardly from the upper partition 15 to the duct wall 25.

The lower portions of the walls 21 and 22 diverge as do the lower portions of the walls 23 and 24 so that each pair of these walls encloses space above two rows of outlet tubes 13 as illustrated by Fig. 1.

The two similar, slanting walls 26 extend from the base of the gas inlet 19 to the center of the upper duct wall 25, one extending in contact with the gas inlet sides of the triangular partitions 21 and 22 and the other extending in contact with the gas outlet sides of the triangular partitions 23 and 24. The walls 26 and the partitions 21, 22, 23 and 24 separate the gas outlet passages from the outlet tubes 13 to the outlet 20, from the gas inlet passages. Thus there are two similar gas outlet passages, each discharging dust free gas from two rows of outlet tubes 13 through the outlet 20.

The central slanting wall 27 extends from the base of the gas outlet 29 to the center of the duct upper wall 25 and in contact with the gas outlet sides of the triangular partitions 22 and 23 and forms between the partitions 22 and 23 a gas inlet passage from the inlet 19 and which extends between the two upper partitions 15 and 16 and into the spin vanes 14 around the gas outlet tubes 13.

The outer slanting wall 28 extends from the base of the gas outlet 20 to the center of the duct upper wall 25 and in contact with the gas outlet side of the triangular wall 21 and in contact with the side wall 29 of the collector and forms between the wall 21 and the side 29 a gas inlet passage which extends from the inlet 19 and between and around the outlet tubes 13 into the spin vanes 14 around the tubes 13.

The outer slanting wall 30 is similar to the wall 28 and extends from the base of the gas outlet 20 to the center of the duct upper wall 25 and in contact with the gas outlet side of the triangular wall 24 and in contact with the side wall 31 of the collector and forms between the walls 24 and 31 a gas inlet passage which extends from the inlet 19 and between and around the outlet tubes 13 into the spin vanes 14 around the tubes 13.

Thus there are three gas inlet passages, one between the walls 22 and 23, one between the walls 21 and 29 and one between the walls 24 and 31.

The slanting walls 27, 28, and 30 deflect the entering gas into the spin vanes 14 and separate the gas inlet and outlet passages at one side of the collector while the two similar, slanting walls 26 deflect the leaving gas from the tubes 13 into the gas outlet 20 and separate the gas inlet and outlet passages at the other side of the collector.

In operation the dust laden gas is moved into the inlet 19 under the influence of a fan which is not shown and is deflected by the walls 22, 23, and 27, the walls 21, 28, and 29, and the walls 24, 30, and 31 through the three gas inlet passages previously described and around the upper ends of the outlet tubes 13 and into the spin vanes 14. The gas is given a rotary motion by the vanes 14 and the solid particles entrained therein are thrown against the inner walls of the cyclone tubes 12 and fall into the hopper 11.

The dust free gas enters the lower ends of the gas outlet tubes 13 and passes from the tubes 13 into the two gas outlet passages formed by the slanting walls 26 and the vertical triangular walls 21, 22, 23, and 24. The gas moves through these passages into the outlet 20.

While one embodiment of the invention has been described for the purpose of illustration, it should be understood that the invention is not limited to the exact apparatus and arrangement of apparatus illustrated, as modifications thereof may be suggested by those skilled in the art without departure from the essence of the invention.

What is claimed is:

In a dust collector having a plurality of substantially vertical cyclone tubes having aligned upper ends enclosed in a substantially horizontal apertured wall, having a plurality of smaller gas outlet tubes having aligned upper ends extending from and above said cyclone tubes, having spin vanes between said cyclone and outlet tubes, and having a substantially horizontal gas duct above said tubes, said duct having an inlet at one end and an outlet at the other end, the combination of a pair of spaced, substantially horizontal, apertured walls enclosing said upper ends of said outlet tubes, and extending from one end of said collector to the opposite end thereof, partitions extending upwardly from the sides of the walls of said pair to the lower portion of said duct, similar triangular partitions extending upwardly from said partitions, and contacting the upper wall of said duct between said inlet and outlet with their apices, said triangular partitions having sides sloping from said apices to the lower portions of said inlet and outlet, and other partitions extending from said upper wall at the points of contact of said apices to said lower portions of said inlet and outlet and extending between said triangular partitions and contacting said sloping sides thereof, said partitions and said pair of walls forming substantially constant volume, gas inlet passages from said inlet into said vanes and forming substantially constant volume, gas outlet passages from said outlet tubes to said outlet.

ROLAND L. LINCOLN.